US012654519B2

(12) United States Patent
Alidra et al.

(10) Patent No.: US 12,654,519 B2
(45) Date of Patent: Jun. 16, 2026

(54) METHOD FOR CONTROLLING AN OPACIFYING GLAZING FOR A MOTOR VEHICLE

(71) Applicant: RENAULT S.A.S, Boulogne Billancourt (FR)

(72) Inventors: Ludovic Alidra, Guyancourt (FR); Samuel Campana, Guyancourt (FR); Maurin Isnard, Guyancourt (FR); Delphine Lopez, Guyancourt (FR); Yann Ollivier, Guyancourt (FR); Brigitte Savariault, Guyancourt (FR)

(73) Assignee: RENAULT S.A.S, Boulogne Billancourt (FR)

( * ) Notice: Subject to any disclaimer, the term of this patent is extended or adjusted under 35 U.S.C. 154(b) by 75 days.

(21) Appl. No.: 18/580,235

(22) PCT Filed: Jun. 30, 2022

(86) PCT No.: PCT/EP2022/068147
§ 371 (c)(1),
(2) Date: Jan. 18, 2024

(87) PCT Pub. No.: WO2023/001522
PCT Pub. Date: Jan. 26, 2023

(65) Prior Publication Data
US 2025/0340103 A1 Nov. 6, 2025

(30) Foreign Application Priority Data
Jul. 21, 2021 (FR) ....................................... 2107874

(51) Int. Cl.
*B60J 3/04* (2006.01)
*B32B 17/10* (2006.01)
*G02F 1/1334* (2006.01)

(52) U.S. Cl.
CPC ........... *B60J 3/04* (2013.01); *B32B 17/10036* (2013.01); *B32B 17/10513* (2013.01);
(Continued)

(58) Field of Classification Search
CPC ........ B32B 17/10036; B32B 17/10513; B32B 17/10614; B32B 2605/00; B60J 3/04; G02F 1/1334
See application file for complete search history.

(56) References Cited

U.S. PATENT DOCUMENTS 6,039,390 A * 3/2000 Agrawal ........... G02F 1/133308
296/211
6,493,128 B1 12/2002 Agrawal et al.
(Continued)

FOREIGN PATENT DOCUMENTS

JP 2008222045 A 9/2008
JP 2014046836 A 3/2014
(Continued)

OTHER PUBLICATIONS

International Search Report mailed on Sep. 14, 2022 in PCT/EP2022/068147 filed on Jun. 30, 2022 (citing references 1-5 & 15 therein, 2 pages).
(Continued)

*Primary Examiner* — David Y Chung
(74) *Attorney, Agent, or Firm* — Oblon, McClelland, Maier & Neustadt, L.L.P.

(57) ABSTRACT

A method is for controlling an opacifying glazing for a motor vehicle. The glazing includes at least two partitions. The opacity level of each partition is controlled independently to progress between a minimum value and a maximum value.

7 Claims, 7 Drawing Sheets

(52) U.S. Cl.
CPC ...... *B32B 17/10614* (2013.01); *G02F 1/1334*
(2013.01); *B32B 2605/00* (2013.01)

(56) References Cited

U.S. PATENT DOCUMENTS

| | | | |
|---|---|---|---|
| 2009/0015740 A1 * | 1/2009 | Sagitov ..................... | B60J 3/04 |
| | | | 349/16 |
| 2015/0367782 A1 | 12/2015 | Mannheim Astete et al. | |
| 2017/0334271 A1 | 11/2017 | Driscoll et al. | |

FOREIGN PATENT DOCUMENTS

| | | | |
|---|---|---|---|
| JP | 2017011626 A | 1/2017 |
| JP | 2021059219 A | 4/2021 |
| WO | WO 2017/201368 A1 | 11/2017 |

OTHER PUBLICATIONS

Preliminary French Search Report dated Mar. 25, 2022 in French
Application 2107874 filed on Jul. 21, 2021 (citing references 1-5 &
15 therein, 3 pages, with Translation of Categories).
Office Action issued Mar. 31, 2026 in Japanese Patent Application
No. 2024-503997, with short summary in English citing Documents
1-4 therein.

* cited by examiner 41    42

4

E1

E2

METHOD FOR CONTROLLING AN OPACIFYING GLAZING FOR A MOTOR VEHICLE

BACKGROUND

The invention concerns a method for controlling an opacifying glazing unit for a motor vehicle. The invention also relates to an opacifying glazing device for a motor vehicle. The invention also relates to a computer program implementing the aforementioned method. The invention lastly relates to a storage medium on which such a program is stored.

Motor vehicles equipped with a fixed glass roof or a sunroof are generally provided with a shading means, which can be a flexible or rigid screen and opens mechanically or electrically. This shading means is indispensable to the visual and thermal comfort of the users of the motor vehicle. However, it significantly increases the mass of the vehicle and reduces its roominess.

In order to reduce the mass and the volume of the shading means, solutions implementing an opacifying glazing unit have been developed. The use of an opacifying glazing unit moreover offers multiple possibilities for opacifying the passenger compartment.

However, this solution has drawbacks. This is because, for a user, an opacifying glazing unit is less intuitive to use than a physical blind. In particular, the user can encounter difficulties in appropriating the new possibilities offered by the opacifying glazing unit and the commands allowing them to modify the opacity of the glazing unit as required.

BRIEF SUMMARY

The aim of the invention is to provide a device and a method for controlling an opacifying glazing unit that remedy the above drawbacks and improve on the devices and methods for controlling an opacifying glazing unit that are known from the prior art. In particular, the invention makes it possible to produce a device and a method which are simple and reliable and which allow intuitive, independent and gradual control of the opacity of each part of an opacifying glazing unit.

To that end, the invention relates to a method for controlling an opacifying glazing unit for a motor vehicle, the glazing unit comprising at least two partitions, the opacity level of each partition being commanded autonomously to change between a minimum value and a maximum value.

Each partition can take a number n of levels of opacity that are numbered in an order of increasing opacity, where $n>2$, notably $n=3$ or $n=4$ or $n=5$.

In one embodiment, a first type of command for the opacity level of a partition that takes a value of the opacity level of rank j, notably a short press on a control button, involves:

- a unit reduction in the value of the opacity level of the partition to a value of the opacity level of rank $j−1$, or
- a unit increase in the value of the opacity level of the partition to a value of the opacity level of rank $j+1$, and
- a second type of command for the opacity level of a partition that takes a value of the opacity level of rank j, notably a long press on a control button, involves:
- a multiple-unit reduction in the value of the opacity level of the partition or a reduction in the value of the opacity level of the partition to a minimum value, or a multiple-unit increase in the value of the opacity level of the partition or an increase in the value of the opacity level of the partition to the maximum value.

Each partition of the glazing unit can be associated with a separate control element, for example associated with a separate control button.

The method can comprise a step of automatically managing the glazing unit on the basis of data from a set of sensors.

The invention moreover relates to a device for controlling an opacifying glazing unit, the device comprising hardware and/or software elements implementing the method as defined above.

The invention also relates to a motor vehicle equipped with a control device as defined above.

The invention also relates to a computer program product comprising program code instructions stored on a computer-readable medium for implementing the steps of the method as defined above when said program is run on a computer, or computer program product able to be downloaded from a communication network and/or stored on a computer-readable and/or computer-executable data medium, characterized in that it comprises instructions that, when the program is executed by the computer, prompt said computer to implement the method as defined above.

The invention also relates to a computer-readable data storage medium on which is stored a computer program comprising program code instructions for implementing the method as defined above, or computer-readable storage medium comprising instructions that, when they are executed by a computer, prompt said computer to implement the method as defined above.

The invention also relates to a signal from a data medium carrying the computer program product defined above.

BRIEF DESCRIPTION OF THE DRAWINGS

The appended drawing shows, by way of example, one embodiment of a glazing device according to the invention and one embodiment of a control method according to the invention.

DETAILED DESCRIPTION

Figure 1:
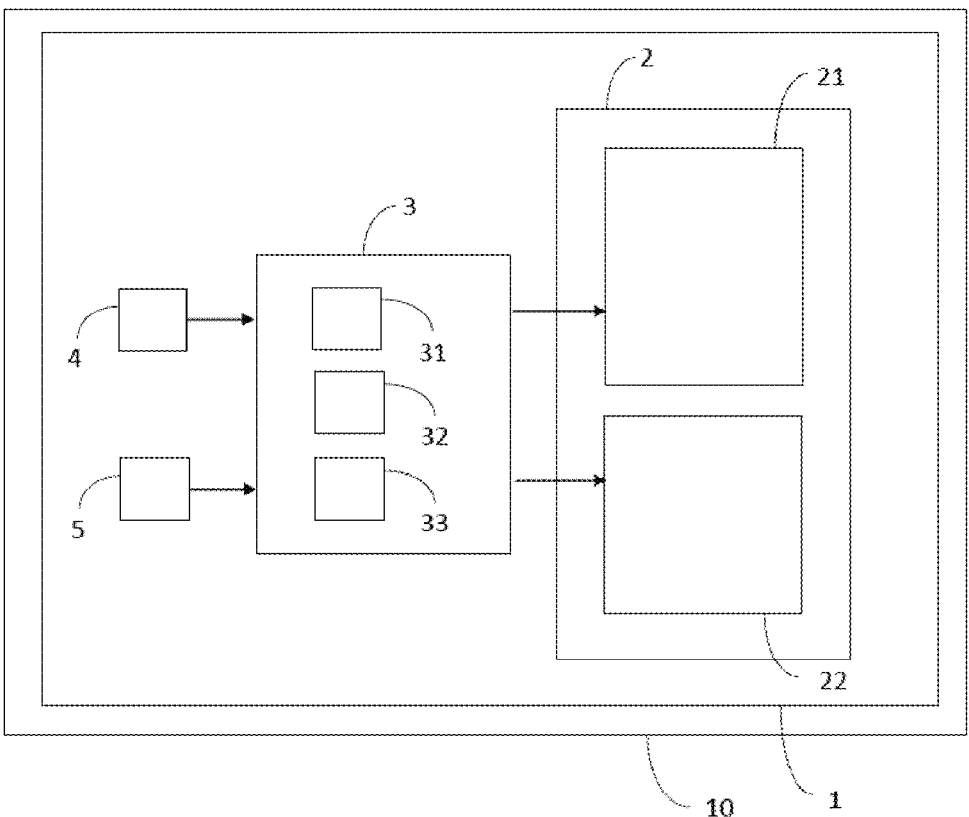
FIG. 1 shows a motor vehicle equipped with a glazing device.
Figure 2:
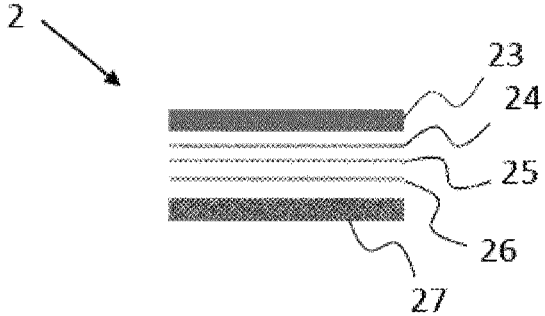
FIG. 2 shows a sectional view of one embodiment of an opacifying glazing unit.

One example of a motor vehicle 10 equipped with one embodiment of a glazing device 1 for an opacifying glazing unit is described below with reference to FIG. 1.

The motor vehicle 10 may be a vehicle of any type, notably a passenger vehicle or a utility vehicle.

The glazing device 1 mainly comprises the following elements:

- an opacifying glazing unit 2, notably an opacifying roof glazing unit,
- a microprocessor 3,
- a control interface 4,
- a set of sensors 5.

One embodiment of an opacifying glazing unit 2 is illustrated in FIGS. 2 to 5.

The opacifying glazing unit 2 makes it possible to implement a variable opacity of the glazing unit. The opacity of the glazing unit can be characterized by various physical variables, notably a light ray transmission percentage. The opacity can vary between at least two values, a minimum value OP1 corresponding to a state referred to as "clear state" or "transparent state" of the glazing unit, and a maximum value OPn corresponding to a state referred to as "dark state" of the glazing unit. Various technologies moreover make it possible to implement intermediate states of opacification. This is the case notably for PDLC ("polymer dispersed liquid crystal") technology, which is described as a preference in this document.

Figure 3:
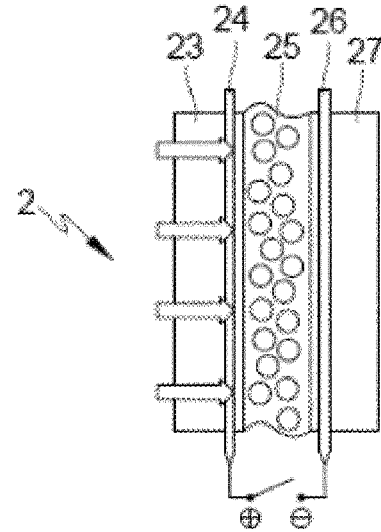
FIG. 3 shows an operating principle for an opacifying glazing unit.
Figure 4:
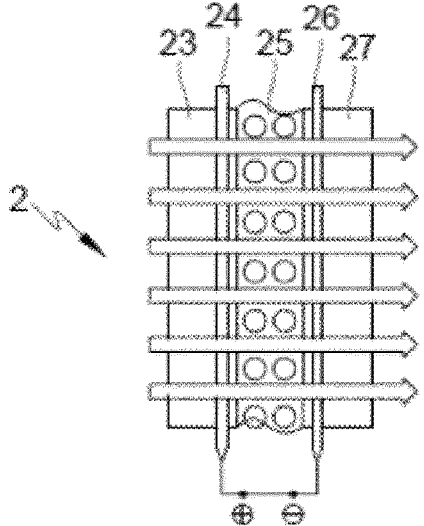
FIG. 4 shows an operating principle for an opacifying glazing unit.

In this embodiment shown in FIGS. 3 and 4, the opacifying glazing unit 2 comprises an opacifying film 25, notably a PDLC film, which is laminated between two glass layers 23, 27. A PDLC film is made up of liquid crystals embedded in a polymer resin.

A first and a second conductive layer 24, 26 are respectively disposed between the opacifying film 25 and each of the glass layers 23, 27.

As illustrated in FIGS. 3 and 4, the modification of the opacity of the glazing unit is commanded by applying an electrical voltage between the first and the second conductive layer 24, 26.

In FIGS. 3 and 4, the light enters the glazing unit via the glass layer 23.

In FIG. 3, since no voltage has been applied between the two conductive layers 24, 26, the liquid crystals are disposed randomly in the polymer resin and prevent the transmission of light. The glass layer 27 therefore receives very little light.

In FIG. 4, the application of a voltage between the two conductive layers 24, 26 causes the liquid crystals to become oriented in the polymer resin, thereby allowing the transmission of light through the PDLC film. The glass layer 27 therefore receives a significant amount of light.

In the rest of the document, the expression "command to modify the opacity" is used to denote the application of a voltage between the two conductive layers 24, 26 of the opacifying glazing unit, and the voltage applied can be zero or non-zero.

Advantageously, the glazing unit comprises at least two partitions or parts 21, 22, the opacity level of each partition being commanded autonomously to change between the minimum opacity value OP1 and the maximum opacity value OPn.

Figure 5:
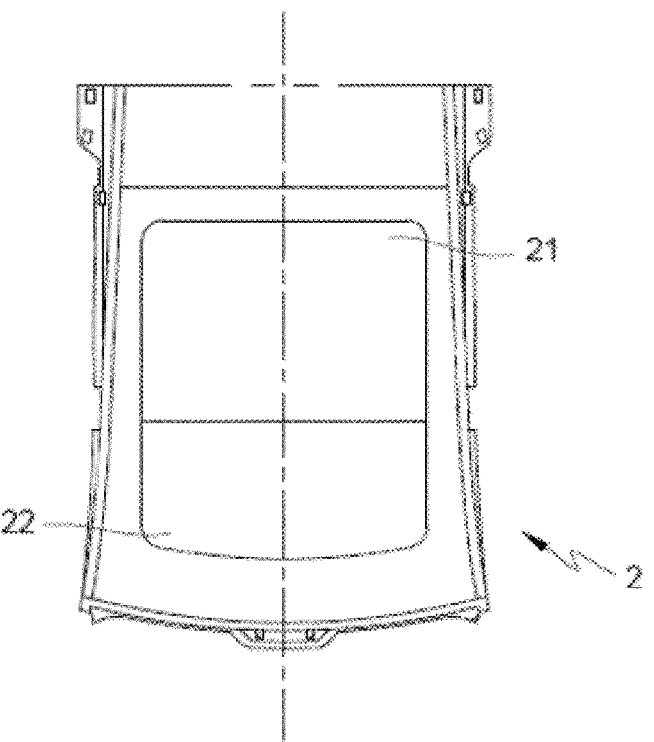
FIG. 5 shows a top view of one embodiment of an opacifying glazing unit.

In the embodiment illustrated in more detail in FIG. 5, the glazing unit 2 is a roof glazing unit for a motor vehicle. The opacifying film has been cut, notably into two disconnected segments, upstream of being shaped between two glass sheets. The glazing unit 2 thus has two partitions 21, 22, respectively associated with the two segments of opacifying film.

Cutting the opacifying film into two disconnected segments thus makes it possible to independently command each of the two partitions defined by the segments in order to modify its opacity.

The role of the glazing device 1 is to implement commands for the set of partitions 21, 22 of the opacifying glazing unit 2, which enables independent and gradual opacification (or increase in the opacity) and de-opacification (or reduction in the opacity) of the opacity of each partition of the opacifying glazing unit 2.

The level of each partition 21, 22 can change between a minimum value OP1 and a maximum value OPn.

In a preferential embodiment, each partition takes a number n of levels of opacity (OP1, . . . , OPn) that are numbered in an order of increasing opacity. Preferably, n>2. Advantageously, n=3 or n=4 or n=5.

Figure 6:
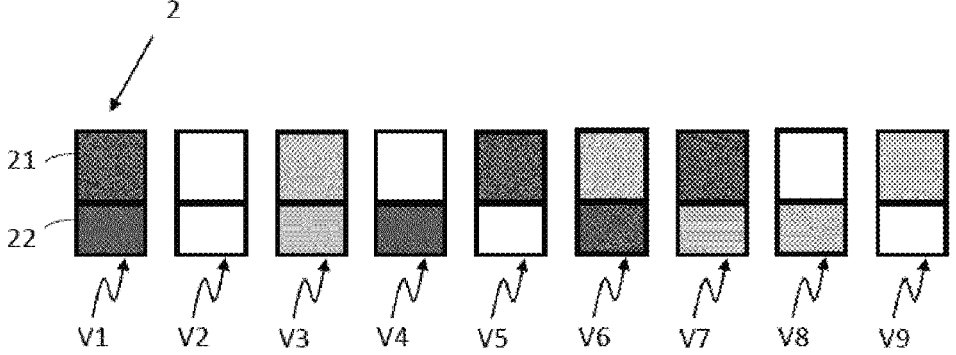
FIG. 6 schematically shows one embodiment of partitions and states of the opacifying glazing unit.

In the embodiment illustrated in FIG. 6, the partitions 21, 22 are defined so as to enable differentiated opacification between the front and the rear of the vehicle, the partition 21 being located in the front part of the glazing unit and the partition 22 being located in the rear part of the glazing unit.

In the embodiment illustrated in FIG. 6, a set of possible states for a glazing unit implementing the partitions 21, 22 is defined as a function of three levels of opacity: a minimum level OP1, an intermediate level OP2 and a maximum level OP3.

The partitions 21 and 22 combined with the three levels of opacity OP1, OP2, OP3 make it possible to implement nine glazing-unit states V1 to V9:

- the first glazing-unit state V1 corresponds to the application of the maximum opacity level OP3 to the two partitions 21, 22,
- the second glazing-unit state V2 corresponds to the application of the minimum opacity level OP1 to the two partitions 21, 22,
- the third glazing-unit state V3 corresponds to the application of the intermediate opacity level OP2 to the two partitions 21, 22,
- the fourth glazing-unit state V4 corresponds to the application of the minimum opacity level OP1 to the partition 21, and the application of the maximum opacity level OP3 to the partition 22,
- the fifth glazing-unit state V5 corresponds to the application of the maximum opacity level OP3 to the partition 21, and the application of the minimum opacity level OP1 to the partition 22,
- the sixth glazing-unit state V6 corresponds to the application of the intermediate opacity level OP2 to the partition 21, and the application of the maximum opacity level OP3 to the partition 22,
- the seventh glazing-unit state V7 corresponds to the application of the maximum opacity level OP3 to the partition 21, and the application of the intermediate opacity level OP2 to the partition 22,
- the eighth glazing-unit state V8 corresponds to the application of the minimum opacity level OP1 to the partition 21, and the application of the intermediate opacity level OP2 to the partition 22,
- the ninth glazing-unit state V9 corresponds to the application of the intermediate opacity level OP2 to the partition 21, and the application of the minimum opacity level OP1 to the partition 22.

As an alternative, other sets of stable states of the glazing unit could be defined by varying the number of partitions and/or the number of opacity levels, the latter being greater than or equal to two.

Advantageously, the partitions 21, 22 are defined so as to enable differentiated opacification between the front and the rear of the vehicle. As an alternative, other embodiments of the partitions could enable differentiated opacification between the right-hand part and the left-hand part of the vehicle.

The glazing device 1 moreover comprises a control interface 4 which allows a user of the vehicle to select the state V1, V2, V3, V4, V5, V6, V7, V8, V9 of the glazing unit that they wish to implement in the motor vehicle 10.

In a first preferential embodiment, the control interface 4 associates a control element with each partition 21, 22 of the glazing unit.

Figure 7:
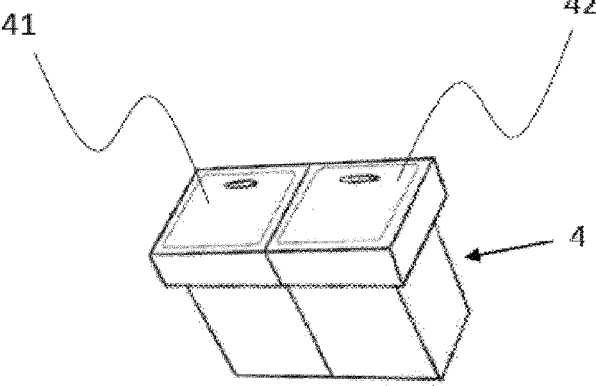
FIG. 7 shows one embodiment of a control interface.

Thus, for a glazing unit comprising two partitions 21, 22, the control interface 4 comprises two control elements 41, 42. As illustrated in FIG. 7, the two control elements can be realized by two separate buttons 41, 42 or by one button comprising two pressing zones 41, 42.

In a variant, the control interface could be a touchscreen which shows the partitions of the glazing unit. The control interface thus comprises as many control elements, in the present case as many pressing zones, as partitions.

A press on one of the control elements 41, 42 causes a modification of the opacity of that partition 21, 22 of the glazing unit that is associated with the control element.

Advantageously, the spatial disposition of the control elements 41, 42 is defined consistent with the spatial disposition of the partitions. For example, if a first and a second partition 21, 22 are respectively disposed from front to rear of the vehicle, a first and a second control element 41, 42 will be respectively disposed from front to rear of the vehicle, with the first control element 41 controlling the first partition 21 and the second control element 42 controlling the second partition.

A press on one of the control elements 41, 42 causes a modification of the opacity of that partition 21, 22 of the glazing unit that is associated with the control element.

In addition, the button makes it possible to measure a press duration DAPP. This measurement thus makes it possible to categorize the presses by comparing their duration with a threshold APPMIN. As a result, a press with a duration strictly less than the threshold APPMIN will be considered to be a "short press", and a press with a duration greater than or equal to the threshold APPMIN will be considered to be a "long press". The categorization of the presses depending on their duration makes it possible to differentiate the processing depending on the category of the press, as described later on in this document.

Figure 11:
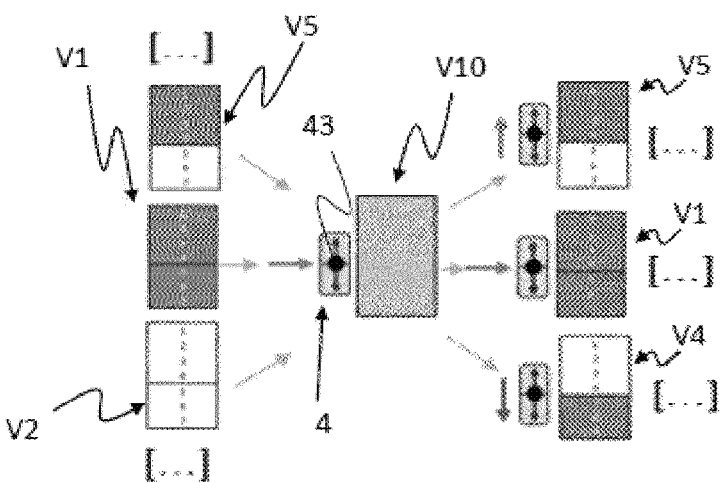
FIG. 11 illustrates a second operating logic of the opacifying glazing unit.

Optionally, the button 4 may comprise a third control element 43, shown in more detail in FIG. 11. The third control element 43 is preferably located between the first and second control elements 41, 42. The third control element 43 makes it possible to activate an automatic control mode for the glazing unit, which is described later on in the document.

In a second embodiment, alternatively or additionally to the first embodiment, the control interface 4 could be realized by a human/machine interface which can, for example, be provided by the touchscreen of the vehicle or a cellphone application.

The human/machine interface could make it possible to control the glazing unit 2 on the basis of the same parameters as a physical button, that is to say the selection of a partition which is commanded to modify its opacity and a press duration DAPP. Instead of, strictly speaking, commanding a press duration, the user could select a type of press between two propositions, notably a long press or a short press.

Alternatively, the human/machine interface could make it possible to select a final state of the glazing unit from among all the possible states V1, V2, V3, V4, V5, V6, V7, V8, V9, for example by clicking directly on a visual representation of the possible states for the glazing unit 2.

In addition or alternatively, the human/machine interface could also comprise voice control, notably making it possible to activate automatic control of the glazing unit.

The glazing device may furthermore comprise a set of sensors 5. The set of sensors 5 supplies data for implementing automatic control of the glazing unit 2. For example, the set of sensors 5 may comprise one or more insolation sensors, which are advantageously placed on the roof of the vehicle. The data from these insolation sensors can make it possible to automatically determine what roof partitions must be opacified in order to protect the passenger compartment from the sun's rays.

In addition or alternatively, the set of sensors 5 may comprise one or more internal and/or external temperature and/or insolation sensors disposed on the motor vehicle 10. The temperature and/or insolation sensors can make it possible to implement automatic control of the opacifying glazing unit, for example to reach and maintain a desired inside temperature. The information sent by the at least one sensor can thus directly influence the partitions and/or the opacity levels.

Moreover, the outside-temperature sensors could make it possible to manage the influence of the outside temperature on the operation of the opacifying roof. Specifically, very low temperatures significantly retard the operation of the opacifying film, this clearly limiting the possibilities of modifying the opacity of the glazing unit. Advantageously, the glazing device 1 could be deactivated when the outside temperature is below a temperature limit threshold, for example the limit threshold possibly being between 0 and –20 degrees. The user would be informed of this deactivation in line with the outside temperature.

The glazing device 1, and particularly the microprocessor, mainly comprises the following modules:

a module 31 for detecting a command to change the opacity of the glazing unit, it being possible for the module 31 to interact with the control interface 4, a module 32 for controlling the opacity of a partition, it being possible for the module to interact with the glazing unit 2, a module 33 for automatically managing the glazing unit, it being possible for the module to interact with the glazing unit 2 and the set of sensors 5.

The motor vehicle 10, in particular the glazing device 1, preferably comprises all the hardware and/or software elements configured so as to implement the method defined in the subject matter of the invention or the method described below.

Figure 8:
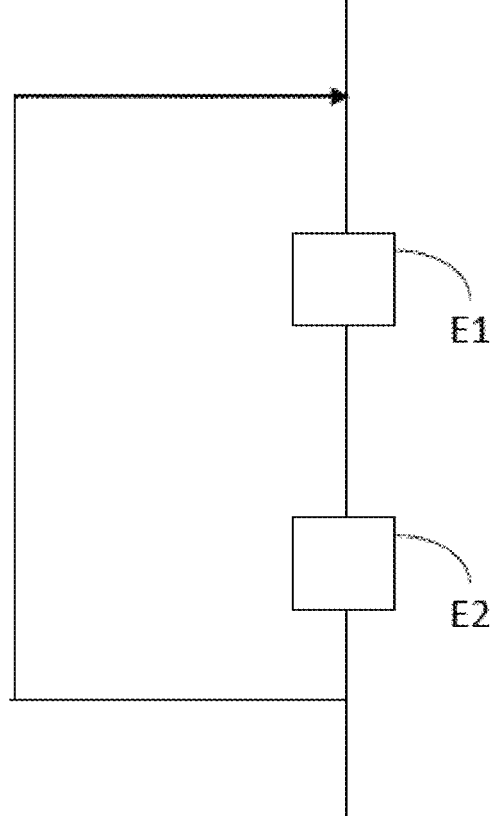
FIG. 8 shows a flowchart of a first embodiment of a control method.

A first embodiment of the method for controlling an opacifying glazing is described below with reference to FIG. 8.

In a first step E1, a command to change the opacity of the glazing is detected at a time T.

The detecting step E1 comprises a substep E11 of determining a controlled partition and a substep E12 of determining a first or a second type of command.

In the first embodiment of the control interface 4, the detection of a command to change the opacity of the glazing unit is triggered by a press on a control button 4, notably on the control elements 41, 42 of the control button.

Thus, if the interface is realized by one control button 4, the substep E11 of determining a controlled partition comprises detecting that the control element 41 which determines the controlled partition as being the first partition 21 has been pressed and/or detecting that the control element 42 which determines the controlled partition as being the second partition 22 has been pressed.

Furthermore, the substep E12 of determining a first or a second type of control can comprise determining the press duration DAPP on the control button and comparing the press duration DAPP with a minimum threshold APPMIN:

the first type of command is determined by a short press, that is to say a press which has a duration strictly less than the minimum threshold APPMIN, and the second type of command is determined by a long press, which has a duration greater than or equal to the minimum threshold APPMIN.

At the end of the first step E1, the second step E2 of controlling the opacity of the controlled partition is carried out.

The controlled partition 21, 22 is considered to be a partition of the glazing unit that can take n opacity levels (OP1, . . . , OPn) that are numbered in an order of increasing opacity.

In step E2, the opacity level of the controlled partition is modified as a function of the type of command detected in step E1 and as a function of the initial opacity level of the controlled partition.

Step E2 comprises a substep E21 of determining an initial opacity of the controlled partition. The initial opacity corresponds to the opacity of the controlled partition at the time T when the command to change the opacity is issued.

With the aforementioned glazing technology, the opacity of a partition is determined by the voltage applied to the partition. Notably, in one embodiment of the method, a correspondence table giving the correlation between voltage and opacity can determine a correlation between each opacity value OPi of the glazing unit and a voltage Vi to be applied to a partition of the glazing unit to implement the opacity level OPi.

Thus, by knowing the voltage applied to the controlled partition, the index j of its initial opacity level OPj is determined, with j being between 1 and n inclusive.

Step E2 moreover comprises a substep E22 of determining a final opacity of the controlled partition on the basis of the initial opacity OPj and the type of command.

A command of the first type applied to a partition exhibiting an initial opacity level OPj causes:

a unit reduction in the value of the opacity level of the partition to a value of the opacity level of rank j−1, OPj−1, or a unit increase in the value of the opacity level of the partition to a value of the opacity level of rank j+1, OPj+1.

In addition, a command of the second type applied to a partition exhibiting an initial opacity level OPj causes:

a multiple-unit reduction in the value of the opacity level of the partition or a reduction in the value of the opacity level of the partition to a minimum value, or a multiple-unit increase in the value of the opacity level of the partition or an increase in the value of the opacity level of the partition to the maximum value.

In other words, a distinction is made between two procedures for implementing the control method: a first implementation procedure, referred to as decreasing, and a second implementation procedure, referred to as increasing.

In the rest of the document, a command of the first type is referred to as "short press" and a command of the second type is referred to as "long press".

In the decreasing implementation procedure, a short press implements unit changes in opacity in a loop or sequence decreasing through the opacity levels (OPn, . . . , OP1). Expressed differently, a short press implements unit reductions in the value of the opacity level of a partition, performing successive transitions between the opacity levels (OPn, . . . , OP1). When the partition is at the minimum opacity level OP1, the effect of a short press is to apply a maximum opacity level OPn to this partition.

As an alternative, in the increasing implementation procedure, a short press implements unit changes in opacity in a loop or sequence increasing through the opacity levels (OP1, . . . , OPn). Expressed differently, a short press implements unit increases in the value of the opacity level of a partition, performing successive transitions between the opacity levels (OP1, . . . , OPn). When the partition is at the maximum opacity level OPn, the effect of a short press is to apply a minimum opacity level OP1 to this partition.

The implementation procedures, whether increasing or decreasing, moreover make it possible to process a long press. A long press has the effect of attributing either a minimum or maximum opacity level to a partition.

The effect of a long press on the opacity of a partition that takes an initial opacity level OPj can be described as follows:

if j=1 (that is to say, if the partition is at a minimum opacity level before the long press), a long press will have the effect of attributing a maximum opacity level OPn to the partition, irrespective of whether the implementation procedure is increasing or decreasing, if j=n (that is to say, if the partition is at a maximum opacity level before the long press), a command of the second type, or long press, will attribute a minimum opacity level OP1 to the partition, irrespective of whether the implementation procedure is increasing or decreasing, otherwise, the opacity level attributed to the partition following a long press depends on the implementation procedure: a decreasing implementation procedure will have the effect of attributing a minimum opacity level OP1 to the partition, and an increasing implementation procedure will have the effect of attributing a maximum opacity level OPn to the partition.

Thus, if the first mode of implementation of the control method is a decreasing procedure, the final opacity level of a partition of initial opacity OPj is determined in the following way:

if j is strictly greater than 1, in the case of a short press the final opacity level is OPj−1, and in the case of a long press the final opacity level is OP1, otherwise the final opacity level is OPn, irrespective of whether the command type is a short press or a long press.

As an alternative, if the first mode of implementation of the control method is an increasing procedure, the final opacity level of a partition of initial opacity OPj is determined in the following way:

if j is strictly less than n, in the case of a short press the final opacity level is OPj+1, and in the case of a long press the final opacity level is OPn, otherwise the final opacity level is OP1, irrespective of whether the command type is a short press or a long press.

As an alternative, a long press could command—in accordance with an increasing procedure—an increase in opacity by multiple levels or steps or an increase in the value of the opacity level by multiple units, or—in accordance with a decreasing procedure—a reduction in opacity by multiple levels or steps or a reduction in the value of the opacity level by multiple units.

Figure 9:
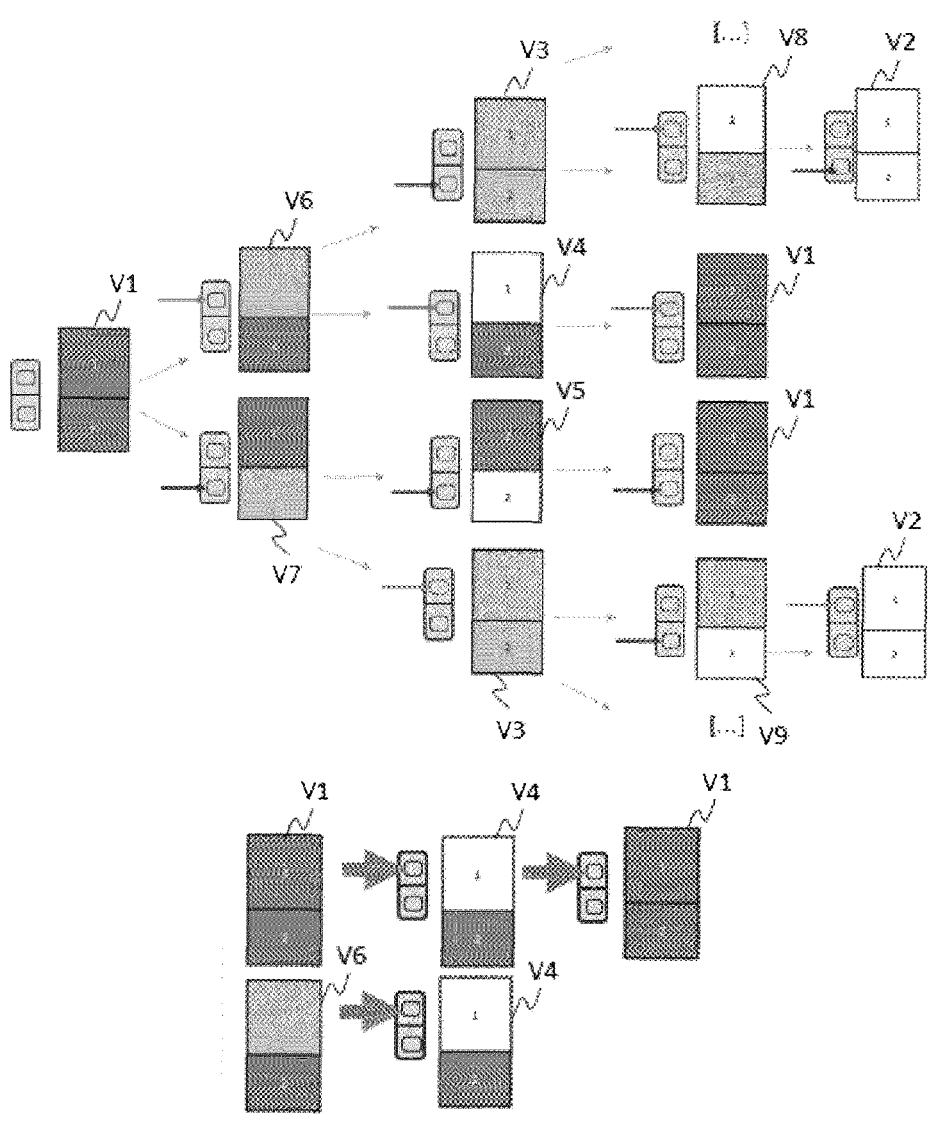
FIG. 9 illustrates a first operating logic of the opacifying glazing unit.

FIG. 9 illustrates the possible opacity modifications according to a decreasing implementation procedure, for a glazing unit comprising two partitions 21, 22 that can each independently take three opacity levels: a minimum level OP1, an intermediate level OP2 and a maximum level OP3. A command of the first type, or short press, is represented by a thin arrow denoting the actuated control element 41, 42. A command of the second type, or long press, is represented by a thick arrow denoting the activated control element 41, 42.

FIG. 9 thus illustrates the transitions implemented by the method as a function of the actuated control element 41, 42 and as a function of the type of command, whether a short press or a long press.

Following the substep of determining the final opacity level of the controlled partition 21, 22, a substep E23 of determining a command to change the opacity of the controlled partition 21, 22 is carried out.

The command to change the opacity of the partition is defined to command a modification of the voltage applied between the first and second conductive layers 24, 26 of the controlled partition 21, 22. The value of the voltage to be applied can notably be determined by the correspondence table giving the correlation between the opacity values (OP1, . . . , OPn) of the glazing unit and various voltage values (V1, . . . , Vn), the opacity level OPk being obtained on a partition 21, 22 by applying the tension Vk between the first and second conductive layers 24, 26 of said partition.

As an alternative or in addition to the first embodiment described above, other embodiment variants could comprise a step E3 of automatically managing the glazing unit.

Figure 10:
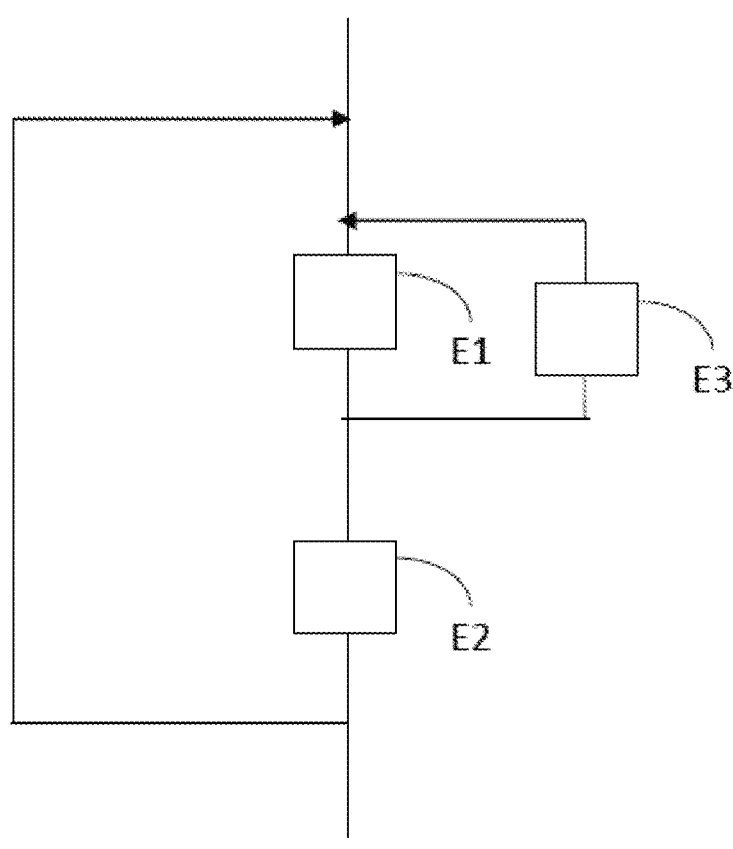
FIG. 10 shows a flowchart of a second embodiment of the control method.

A second embodiment of the control method comprising a step E3 of automatically managing the glazing unit is described in FIG. 10.

In this embodiment, step E1 comprises, apart from the processing described above for this step, detecting a command for activation of an automatic mode.

In one embodiment of the control interface 4 involving a button, a command for activation of an automatic mode can be detected by detecting a press on the third control element 43.

As an alternative or additionally, a command for activation of an automatic mode can be detected via a human/machine interface or voice control. The human/machine interface or the voice control can moreover make it possible to control a desired temperature in the passenger compartment.

When a command for activation of the automatic mode is detected, a step E3 of automatically managing the opacifying glazing unit is carried out.

Step E3 comprises determining a target opacity level as a function of measurements from the set of sensors 5. The measurements may comprise one or more measurements of insolation on the roof of the vehicle and/or a measurement of the outside temperature. Advantageously, the measurements also comprise a measurement of the temperature in the passenger compartment of the motor vehicle 10.

Step E3 comprises determining a target temperature corresponding to the temperature desired by the users in the passenger compartment. Depending on the type of control interface used, the target temperature may be determined by the user via a human/machine interface and/or voice control. As an alternative, the target temperature may be determined by a default value, for example 20 degrees, or by a predetermined deviation relative to the outside temperature, it being possible for the predetermined deviation to be a function of the outside temperature.

Taking the defined target temperature and the insolation or temperature measurements as a basis, a target opacity level of the glazing unit that enables the temperature of the passenger compartment to tend toward the target temperature is determined. In addition, an air conditioning device can be used to help reach the target temperature value. In this case, the means for managing the glazing unit and the means for managing the air conditioning device communicate with one another, and at the very least simultaneously receive information from at least one temperature and/or insolation sensor.

In one embodiment of step E3, all the partitions of the glazing unit are simultaneously commanded to implement the target opacity level uniformly over all the partitions of the glazing unit corresponding to the implementation of a tenth state V10 of the glazing unit, shown in FIG. 11. In one embodiment variant, the tenth state V10 of the glazing unit can correspond to state V3 implementing the intermediate opacity level OP2 uniformly over all the partitions of the glazing unit.

In an alternative embodiment, step E3 can comprise selectively modifying one or more of the at least two partitions 21, 22 of the glazing unit, notably as a function of the insolation measurements for determining the direction of the light rays.

Step E3 comprises revising the target opacity level as a function of the updating of the measurements from the set of sensors 5. The opacity of all or part of the at least two partitions of the glazing unit is then modified depending on the revised target opacity level for each partition.

In one embodiment, when a command to change the opacity is detected, notably by a press on one of the first and second locations 41, 42 of the button 4, step E2 of detecting a command to modify the opacity is carried out.

All in all, the invention makes it possible to simply and intuitively control an opacifying glazing unit, each partition of the glazing unit being independently commanded to modify its opacity in accordance with a given number of opacity levels.

The simple and intuitive nature of the invention first of all comes from the association between each partition of the glazing unit to be controlled and a single control element, notably a button or a pressing zone on a button.

Moreover, the simple and intuitive nature of the invention is enhanced by the possibility of changing the opacity of a partition in accordance with a cycle with a single variation (configured to be either a cycle of increasing opacity or a cycle of decreasing opacity). Advantageously, the invention makes it possible to implement a limited number of opacity levels, for example three or four levels, thereby allowing a user to command the desired opacity level with a limited number of presses. The commands are also simplified by the possibility of reaching a minimum or maximum opacity level with a single press of the long press type.

The invention moreover presents the possibility of activating automatic management of the glazing unit as a function of a desired temperature and/or luminosity in the passenger compartment.

Other advantages can be afforded by the possibility for a user to configure the glazing device as required, notably to define the number of desired opacity levels.

Advantageously, the automatic management of the glazing unit could also be configured to use different sets of partitions and opacity levels depending on the weather conditions. For example, the automatic management of the glazing unit could use a first set of partitions in a first insolation configuration, this first set of partitions and opacity levels notably making it possible to differentiate between the opacities of the front and rear parts of the passenger compartment in order to adapt the opacity of the glazing unit depending on the direction of the sun's rays, and a second set of partitions and opacity levels in a second insolation configuration, this second set of partitions and opacity levels making it possible, for example, to optimize the maintenance of a target temperature in the passenger compartment.

The invention claimed is:

1. A method for controlling an opacifying glazing unit for a motor vehicle, the glazing unit comprising:

at least two partitions, an opacity level of each of the partitions being commanded autonomously to change between a minimum value and a maximum value, wherein each of the partitions takes a number n of levels of opacity that are numbered in an order of increasing opacity, where n=3 or n=4 or n=5, wherein a first type of command for the opacity level of a partition that takes a value of the opacity level of rank j, involves:

a unit reduction in the value of the opacity level of the partition to a value of the opacity level of rank j−1, or a unit increase in the value of the opacity level of the partition to a value of the opacity level of rank j+1, and a second type of command for the opacity level of a partition that takes a value of the opacity level of rank j, involves:

a multiple-unit reduction in the value of the opacity level of the partition or a reduction in the value of the opacity level of the partition to a minimum value, or a multiple-unit increase in the value of the opacity level of the partition or an increase in the value of the opacity level of the partition to the maximum value, and wherein the first type of command is a first press on a control button and the second type of command is a second press on the control button, the first press being shorter than the second press.

2. The control method as claimed in claim 1, wherein each partition of the glazing unit is associated with a separate control element.

3. The control method as claimed in claim 1, wherein each partition of the glazing unit is associated with a separate control button.

4. The control method as claimed in claim 1, further comprising automatically managing the glazing unit based on data from a set of sensors.

5. A device for controlling an opacifying glazing unit, the device comprising:

hardware and/or software elements configured to implement the control method as claimed in claim 1.

6. A motor vehicle comprising:

the device as claimed in claim 5.

7. A non-transitory computer readable medium storing a program that, when executed by a computer, causes the computer to execute the control method as claimed in claim 1.

* * * * *